Aug. 14, 1923.

G. C. HOADLEY 1,464,934

SCALE TICKET FILING CABINET

Filed Oct. 20, 1922   3 Sheets-Sheet 1

Aug. 14, 1923.
G. C. HOADLEY
1,464,934
SCALE TICKET FILING CABINET
Filed Oct. 20, 1922  3 Sheets-Sheet 2
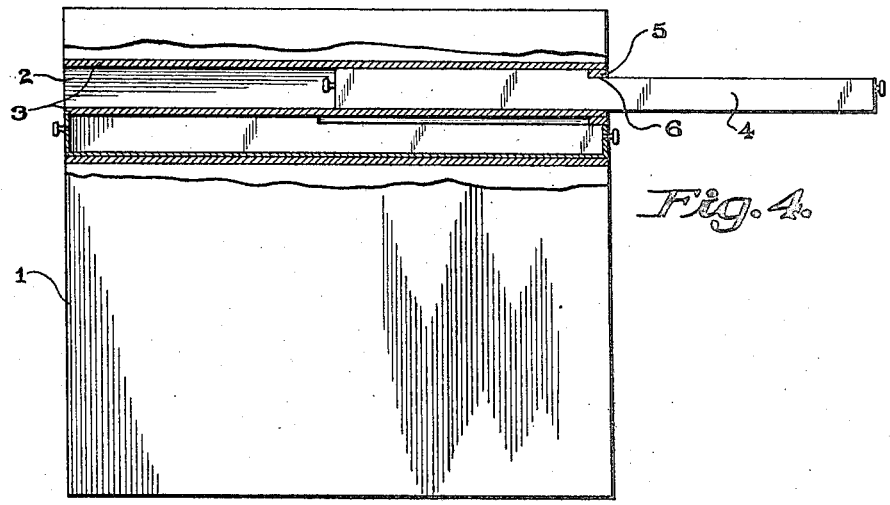
Fig. 4.
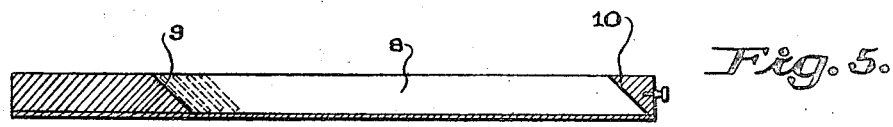
Fig. 5.
Fig. 6.
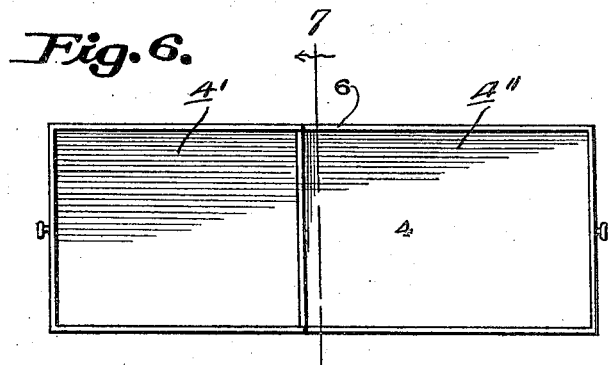
Fig. 7.
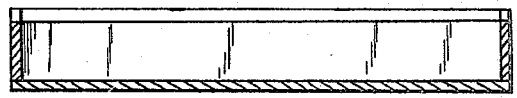
Inventor
G. C. Hoadley
By *[signature]*
Attorney
*[signatures]*
Witnesses

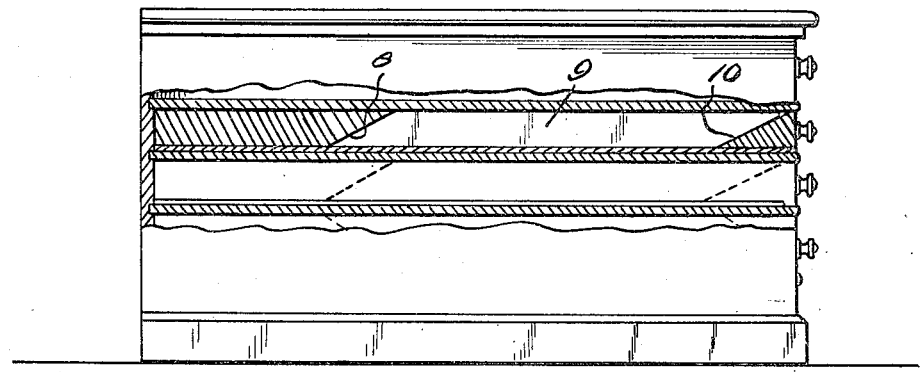

Patented Aug. 14, 1923.

1,464,934

UNITED STATES PATENT OFFICE.

GLENN C. HOADLEY, OF OLATHE, COLORADO.

SCALE-TICKET FILING CABINET.

Application filed October 20, 1922. Serial No. 595,715.

*To all whom it may concern:*

Be it known that I, GLENN C. HOADLEY, a citizen of the United States, residing at Olathe, in the county of Montrose and State of Colorado, have invented certain new and useful Improvements in Scale-Ticket Filing Cabinets, of which the following is a specification.

In the shipment of produce or the like by shippers to the buyer, it is customary for each town wherein goods is shipped to employ what is known as a weight master for properly weighing the produce, and charging the shipper or grower accordingly for this service. For rendering this service properly, it is necessary for the weight master to employ an original, a duplicate, and a triplicate ticket having marked thereon the nature of the produce shipped, the names of the grower and buyer, the driver of the load etc., also the gross, tare and net weight of the shipment, the original ticket to go to the grower, the duplicate to the buyer or shipper, and the triplicate to be retained by the weight master for his permanent files.

Heretofore it has been practically an impossibility to use the above mentioned or similar type of tickets in view of the fact that they are of the type of what are known as loose leaf scale tickets, and no means of adequately filing the same are known. However, in view of the present invention, these tickets may be advantageously used in a simple and expeditious manner.

In carrying out the invention, it is my purpose to provide filing cabinets for these tickets whereby the same may be filed in an easy, convenient and systematic manner, and as conveniently and quickly obtained when necessary, thereby eliminating the necessity of using scale books as is now done.

It is also my purpose to provide filing cabinets for the purpose described, wherein each drawer of a certain one of the cabinets may be pulled out from either the front or rear thereof, so that the attendant in charge of the cabinet will have access thereto from the inside, and also allowing the shipper to have a duplicate ticket after the same has been completely filled out.

With the above recited objects in view and others of a similar nature, the invention resides in the construction, combination and arrangement of parts set forth in, and falling within the scope of the appended claim.

In the accompanying drawings:

Figure 1 is a front elevation of one of my improved filing cabinets.

Figure 2 is a rear view of the same.

Figure 3 is a view in front elevation of a slightly different type of cabinet employed by me in the art of filing the above mentioned tickets.

Figure 4 is a fragmentary vertical sectional view therethrough showing the arrangement of the drawers.

Figure 5 is a longitudinal section through one of the drawers used in the cabinet shown in Figure 3.

Figure 6 is a top plan view of one of the drawers used in the cabinet shown in Figures 1, 2 and 4.

Figure 7 is a tranverse sectional view upon the line 7—7 of Figure 6, looking in the direction of the arrows, and Figure 8 is a fragmentary vertical sectional view of the cabinet shown in Figure 4, more clearly showing the arrangement of the drawers therein, this cabinet being shown in reduced form.

Referring now to the drawings in detail, and particularly to Figures 1, 2, 4 and 6 thereof, 1 designates a cabinet comprising a bottom, side and top walls, and a vertical partition 2 which divides the cabinet into halves. Each half of the cabinet is divided into drawer compartments by means of horizontal partitions 3, that are spaced apart equal distances. Slidably mounted in each drawer compartment is a drawer 4, which may be withdrawn from the cabinet either at the front or rear as clearly illustrated in Figure 4. As shown in Figure 6, these drawer members are divided by a transversely extending partition providing front and rear compartments 4' and 4'' respectively. When pulled from the front, the drawer may be entirely drawn from the cabinet, while when pulled from the rear, the drawer may be only partially withdrawn. In order to prevent the entire withdrawal of the drawer from the rear of the cabinet, I secure to the upper edge of each drawer compartment a strip 5, while the upper edges of the sides of the drawer 4 are cut away as at 6 for approximately one-half the length of the drawer, as clearly shown in Figures 4, 6 and 7. Thus, shoulders are provided at the upper edges of the drawers, which abut the strips 5, when the drawer is pulled from the rear of the cabinet, so that entire withdrawal of the drawer from the cabinet is prevented.

The cabinet shown in Figures 3 and 8 of the drawings comprises bottom, side and top walls, and horizontal partitions 7 spaced apart equal distances to provide drawer compartments, and in each compartment is a drawer 8. Each drawer 8 comprises bottom, side and end walls, as clearly illustrated in Figure 5. These drawers 8 in the cabinet shown in Figures 3 and 8 may be withdrawn from the front side only, and one end wall of each drawer 8 is bevelled downwardly as at 19, while the other end wall is undercut as at 10, at an angle corresponding to the bevelled wall 9.

The drawers 4 in the cabinet 1, and the drawers 8 in the cabinet shown in Figures 3 and 8 are appropriately numbered in numerical order as shown, the drawers of the first mentioned cabinet being numbered at both ends, and each of the drawers of both of the cabinets are adapted to have marked thereon the names of the different companies to whom the goods are shipped.

As above set forth the type of scale ticket employed by me in connection with these file cabinets comprises an original, a duplicate, and a triplicate, the triplicate being of a stiff material such as cardboard and having the original and triplicate tickets secured thereto by adhesive or the like. Each of these tickets are printed with suitable wording thereon in accordance with the above description thereof, and the back of the duplicate and original are carbonized, whereby any marking on the original will similarly mark the duplicate and triplicate, when the tickets are superposed upon one another. After the gross weight of the load has been properly marked upon the original ticket, the weight master then writes the name of the driver of the load upon the lower left hand corner thereof. The unfinished tickets are then filed away in the drawers of the cabinet shown in Figures 3 and 8, the tickets being filed top downward, showing only the bottom edge of the tickets having the driver's name thereon. In view of the above described construction of the drawers 8 in the cabinet shown in Figures 3 and 8, these tickets will assume a position as shown by dotted lines in Figure 5, for readily allowing the weight master to extract the proper ticket from its appropriate drawer.

After removing the tickets from these last mentioned drawers the same are completely filled out, and then filed in the drawers of the cabinet 1, the duplicate ticket being received within the compartment 4″ of the drawers and the original and triplicate in the other compartment 4′, whereby they may be readily removed at any time by the shipper at one side, and the weight master at the other. The construction of the several drawers being such as to allow the shipper to extract only a duplicate ticket.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim as new is:—

A filing-cabinet formed to provide drawer compartments and having the front and rear ends of said compartments open, drawers in said compartments adapted to be withdrawn from the respective compartments from either the front or rear of the cabinet, each drawer at the rear of the cabinet having its upper edges cut away to provide abrupt shoulders centrally of the drawer and strips fastened to the upper sides of said drawer compartments respectively, to engage said shoulders to prevent the withdrawal of each drawer from the rear of the cabinet.

In testimony whereof I affix my signature.

GLENN C. HOADLEY.